(12) United States Patent
Receveur et al.

(10) Patent No.: US 12,548,674 B2
(45) Date of Patent: Feb. 10, 2026

(54) TECHNOLOGIES FOR INFERRING A PATIENT CONDITION USING MACHINE LEARNING

(71) Applicant: Hill-Rom Services, Inc., Batesville, IN (US)

(72) Inventors: Timothy J. Receveur, Guilford, IN (US); Yongji Fu, Harrison, OH (US); Aziz A. Bhai, Fishers, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 1066 days.

(21) Appl. No.: 17/110,600

(22) Filed: Dec. 3, 2020

(65) Prior Publication Data

US 2021/0202091 A1  Jul. 1, 2021

Related U.S. Application Data

(60) Provisional application No. 62/955,517, filed on Dec. 31, 2019.

(51) Int. Cl.
*G16H 50/20* (2018.01)
*A61B 5/00* (2006.01)
(Continued)

(52) U.S. Cl.
CPC .......... *G16H 50/20* (2018.01); *A61B 5/0077* (2013.01); *A61B 5/1115* (2013.01);
(Continued)

(58) Field of Classification Search
CPC ........ G16H 50/20; G16H 10/60; G16H 40/67; G16H 40/40; G16H 40/63; A61B 5/0077; A61B 5/1115; A61B 5/1121; A61B 5/1128; A61B 5/6892; A61B 5/7203; A61B 5/725; A61B 5/7267; A61B 5/447; A61B 2562/0219; A61B 2562/0252;
(Continued)

(56) References Cited

U.S. PATENT DOCUMENTS 9,642,536 B2 *  5/2017  Kashef .................. G16H 20/70
9,830,801 B2 * 11/2017  Rusin ................... G08B 25/001
(Continued)

FOREIGN PATENT DOCUMENTS

EA           039153 B1 *  8/2018
WO    WO2019003859 A1    3/2019

OTHER PUBLICATIONS

Chang et al. ("In-Bed Patient Motion and Pose Analysis Using Depth Videos for Pressure Ulcer Prevention", 2017 IEEE, pp. 4118-4122) (Year: 2017).*
(Continued)

*Primary Examiner* — Imad Kassim
(74) *Attorney, Agent, or Firm* — Barnes & Thornburg LLP

(57) ABSTRACT

A machine learning compute device may include circuitry configured to obtain sensor data from a product associated with a patient. The circuitry may also be configured to obtain response variable data indicative of an actual condition of the patient associated with the sensor data. Additionally, the circuitry may be configured to train, based on the response variable data and the sensor data, an inference model to infer the actual condition of the patient from the sensor data.

20 Claims, 9 Drawing Sheets

(51) Int. Cl.
*A61B 5/11* (2006.01)
*A61G 7/05* (2006.01)
*G06N 20/00* (2019.01)
*G16H 10/60* (2018.01)
*G16H 40/40* (2018.01)
*G16H 40/67* (2018.01)

(52) U.S. Cl.
CPC .......... *A61B 5/1121* (2013.01); *A61B 5/1128* (2013.01); *A61B 5/6892* (2013.01); *A61B 5/7203* (2013.01); *A61B 5/725* (2013.01); *A61B 5/7267* (2013.01); *A61G 7/05* (2013.01); *G06N 20/00* (2019.01); *G16H 10/60* (2018.01); *G16H 40/67* (2018.01); *A61B 5/447* (2013.01); *A61B 2562/0219* (2013.01); *A61B 2562/0252* (2013.01); *A61G 2203/32* (2013.01); *A61G 2203/34* (2013.01); *A61G 2203/36* (2013.01); *A61G 2203/44* (2013.01); *G16H 40/40* (2018.01)

(58) Field of Classification Search
CPC .... A61B 5/1118; A61G 7/05; A61G 2203/32; A61G 2203/34; A61G 2203/36; A61G 2203/44; A61G 7/012; A61G 7/0527; G06N 20/00; G06N 3/08; G06N 3/126; G06N 20/10
See application file for complete search history.

(56) References Cited

U.S. PATENT DOCUMENTS

| | | | |
|---|---|---|---|
| 10,140,837 B2 | 11/2018 | Shen et al. | |
| 10,600,204 B1* | 3/2020 | Rush | A61B 5/746 |
| 11,197,793 B2* | 12/2021 | Refsnæs | A61B 5/6891 |
| 2016/0000383 A1* | 1/2016 | Lee | G16H 30/20 |
| | | | 600/301 |
| 2019/0164285 A1* | 5/2019 | Nye | G16H 10/60 |
| 2019/0192052 A1 | 6/2019 | Weffers-Albu et al. | |
| 2019/0206218 A1* | 7/2019 | Kusens | H04N 13/204 |
| 2019/0214146 A1 | 7/2019 | Dunias et al. | |
| 2019/0221315 A1 | 7/2019 | Weffers-Albu et al. | |
| 2019/0228866 A1 | 7/2019 | Weffers-Albu et al. | |
| 2019/0231231 A1 | 8/2019 | Saria et al. | |
| 2019/0374152 A1* | 12/2019 | Wayne | G16H 50/30 |
| 2020/0015683 A1* | 1/2020 | Katsuki | A61B 5/6891 |
| 2020/0375549 A1* | 12/2020 | Wexler | A61B 5/14532 |
| 2021/0074436 A1* | 3/2021 | Trim | G16H 50/20 |
| 2021/0212606 A1* | 7/2021 | Tran | A61B 5/0024 |

OTHER PUBLICATIONS

Translated version NPL for AI-Shimary EA 039153 B1 filled on Aug. 3, 2018 (Year: 2021).*
Lydon et al. ("Robust heartbeat detection from in-home ballistocardiogram signals of older adults using a bed sensor," 2015 IEEE Engineering in Medicine and Biology Society (EMBC), Milan, Italy, pp. 7175-7179) (Year: 2015).*
Wai et al. (NPL, "Situation-Aware Patient Monitoring in and around the Bed Using Multimodal Sensing Intelligence," 2010 Sixth International Conference on Intelligent Environments, Kuala Lumpur, Malaysia, 2010, pp. 128-133) (Year: 2010).*
Bernal et al. (NPL, "Deep Temporal Multimodal Fusion for Medical Procedure Monitoring Using Wearable Sensors", IEEE Transactions on Multimedia, vol. 20, No. 1, Jan. 2018) (Year: 2018).*

\* cited by examiner

TECHNOLOGIES FOR INFERRING A PATIENT CONDITION USING MACHINE LEARNING

CROSS-REFERENCE TO RELATED APPLICATION

This application claims the benefit, under 35 U.S.C. § 119(e), of U.S. Provisional Patent Application No. 62/955,517, filed Dec. 31, 2019, the entirety of which is hereby expressly incorporated by reference herein.

BACKGROUND

The present disclosure relates to determining a condition of a patient and particularly, to using machine learning to determine a condition of a patient based on sensor data from a product used by the patient.

Modern hospital equipment, such as equipment for supporting a patient (a patient support apparatus, such as a bed, a wheel chair, etc.), may have a multitude of devices such as sensors, actuators, and user interface components (e.g., a screen for displaying data and receiving inputs from a user, one or more physical buttons, dials, levers, etc.) that each operate on (e.g., utilize, produce, etc.) a distinct set of data. The data operated on by the devices may be used to determine the instantaneous state of the equipment (e.g., that the head of the bed is elevated, that the bed is presently supporting a particular amount of weight, etc.). Other equipment may be usable to directly measure certain aspects of the patient's status, such as the present heart rate of the patient. However, the overall condition of the patient (e.g., development of bed sores) utilizing the equipment is typically determined by a human caregiver (e.g., a nurse, a doctor, etc.) upon personally studying the patient. Patients may find such studies intrusive. Furthermore, in a hospital or other setting in which patients are provided care by caregivers, the patients typically outnumber the caregivers, thereby limiting the amount of time that a caregiver can allocate to studying the condition of a given patient.

SUMMARY

The present application discloses one or more of the features recited in the appended claims and/or the following features which, alone or in any combination, may comprise patentable subject matter:

According to an aspect of the present disclosure, a machine learning compute device may include circuitry configured to obtain sensor data from a product associated with a patient. The circuitry may also be configured to obtain response variable data indicative of an actual condition of the patient associated with the sensor data. Additionally, the circuitry may be configured to train, based on the response variable data and the sensor data, an inference model to infer the actual condition of the patient from the sensor data.

The circuitry of the machine learning compute device may further be configured to infer, using the trained inference model, the actual condition of the patient from the sensor data. In some embodiments, in obtaining the sensor data, the circuitry of the machine learning compute device may be configured to obtain sensor data from a hospital bed. The circuitry, in some embodiments, may be configured to obtain force data from one or more load cells of the hospital bed. Additionally or alternatively, the circuitry may be configured to obtain pressure data from one or more pressure sensors of the hospital bed. The circuitry of the machine learning compute device may obtain sensor data that may include scalar data indicative of a magnitude and/or vector data that is indicative of a magnitude and a direction. In some embodiments, the circuitry of the machine learning compute device may be configured to condition the sensor data, such as by removing noise from the sensor data and/or converting the sensor data to a predefined format. The circuitry, in some embodiments, may remove noise from the sensor data by applying a bandpass filter to the sensor data.

In some embodiments, the circuitry of the machine learning compute device may also be configured to determine motion-based features from the sensor data. Further, the circuitry of the machine learning compute device may be configured to identify changes in weight associated with one or more load cells of the hospital bed. Additionally, the circuitry may be configured to identify a transfer of weight from one load cell to another load cell. The circuitry may additionally or alternatively be configured to identify changes in pressure associated with one or more pressure sensors of the hospital bed.

In some embodiments, the circuitry may be configured to obtain response variable data that may include video data of a patient associated with the sensor data. The circuitry may also be configured to obtain video data that has annotation data that describes movements of the patient in relation to the hospital bed. The video data may, in some embodiments, indicate a patient exit from the hospital bed, a patient turning on the hospital bed, or a patient making an assisted turn on the hospital bed.

In some embodiments, the circuitry of the machine learning compute device may be configured to obtain patient assessment data from an electronic medical records system. In doing so, the circuitry may obtain assessment data indicative of a Braden assessment of mobility, a level of consciousness, and/or a safe patient handling index. The circuitry of the machine learning compute device, in some embodiments, may be configured to train the inference model by producing a candidate inference, determining a difference between the candidate inference and the actual condition of the patient indicated in the response variable data, and adjusting the inference model as a function of the determined difference. In adjusting the inference model, the circuitry may be configured to adjust a neural network, a genetic algorithm, or a support vector machine. In some embodiments, the machine learning compute device may be mounted to the hospital bed. The circuitry of the machine learning compute device, in some embodiments, may be additionally configured to produce, using the trained inference model, an inference the actual condition of the patient from the sensor data and provide data indicative of the inference to another device. In doing so, the circuitry may be configured to provide the data indicative of the inference to a remote compute device. For example, the circuitry may provide the inference to a nurse call system, and in some embodiments, the circuitry may provide the inference as an alert.

In another aspect of the present disclosure, a hospital bed is provided. The hospital bed may include a frame, a support deck carried by the frame and adapted to support a mattress for a patient, and one or more sensors. The hospital bed may also include a machine learning compute device having circuitry configured to obtain sensor data from the one or more sensors. The circuitry may also be configured to infer, using a trained inference model, an actual condition of the patient from the sensor data.

The circuitry of the machine learning compute device, in some embodiments, may further be configured to obtain response variable data indicative of an actual condition of the patient associated with the sensor data. The circuitry may also be configured to train, based on the response variable data and the sensor data, the inference model to infer the actual condition of the patient from the sensor data.

In yet another aspect of the present disclosure, a method may include obtaining, by a machine learning compute device, sensor data from a product associated with a patient. The method may also include obtaining, by the machine learning compute device, response variable data indicative of an actual condition of the patient associated with the sensor data. Further, the method may include training, by the machine learning compute device and based on the response variable data and the sensor data, an inference model to infer the actual condition of the patient from the sensor data. In some embodiments, the method may also include inferring, by the machine learning compute device and using the trained inference model, the actual condition of the patient from the sensor data.

In another aspect of the present disclosure, one or more computer-readable storage media may include a set of instructions. When executed, the instructions may cause a machine learning compute device to obtain sensor data from a product associated with a patient. The instructions may also cause the machine learning compute device to obtain response variable data indicative of an actual condition of the patient associated with the sensor data. Further, the instructions may cause the machine learning compute device to train, based on the response variable data and the sensor data, an inference model to infer the actual condition of the patient from the sensor data. In some embodiments, the instructions may additionally cause the machine learning compute device to infer, using the trained inference model, the actual condition of the patient from the sensor data.

Additional features, which alone or in combination with any other feature(s), such as those listed above and/or those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
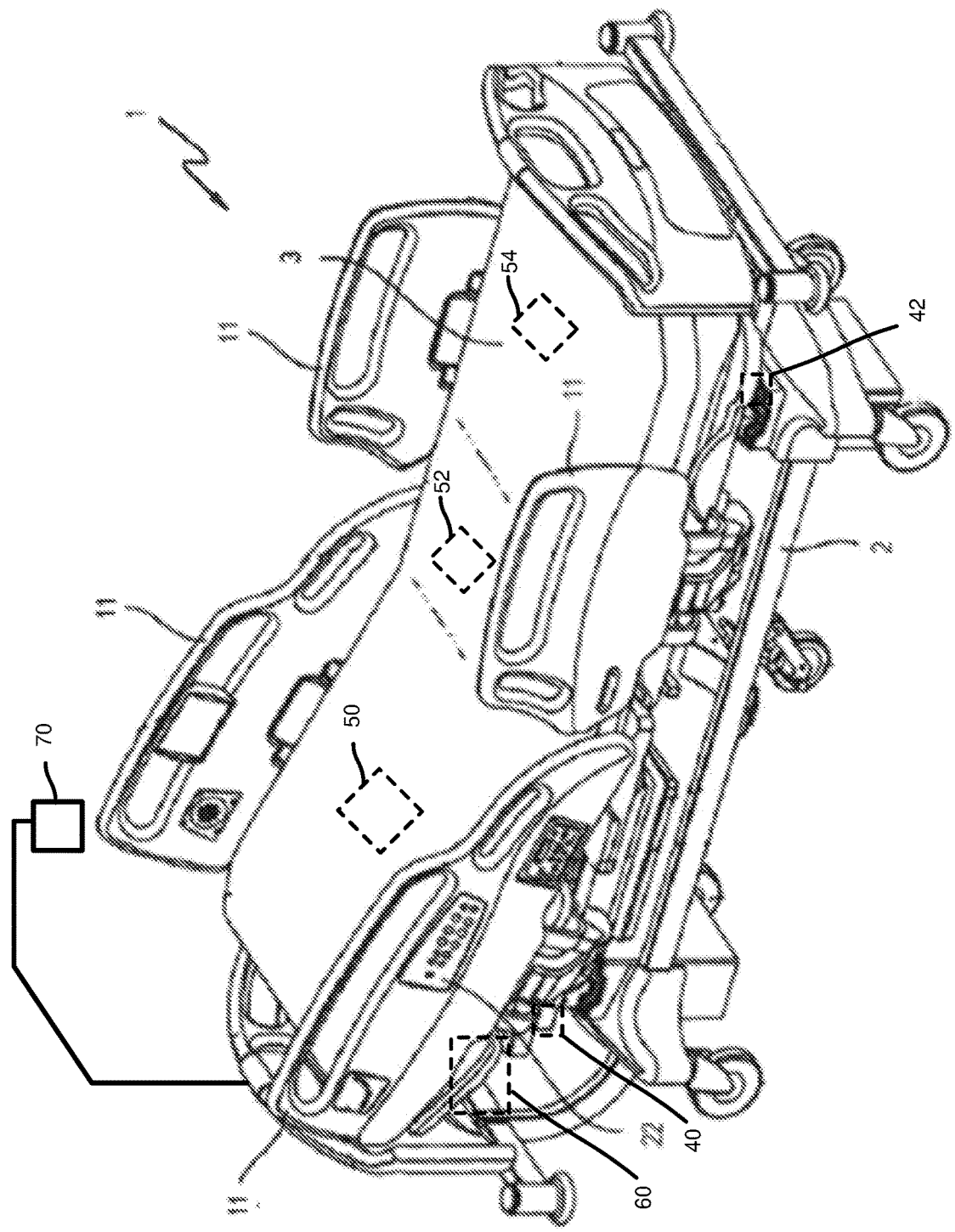
FIG. 1 is a perspective view of at least one embodiment of a hospital bed having sensors and a machine learning compute device for inferring a patient condition.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a patient support apparatus 1 includes a frame 2 and a patient support surface 3, such as a mattress. As can be seen, in FIG. 1, the patient support apparatus is embodied as a hospital bed. However, the patient support apparatus 1 may alternatively be embodied as a stretcher or any other apparatus capable of physically supporting all or a portion of a patient's body. The frame 2 includes a lower frame (aka a base frame), supports or lift mechanisms coupled to the lower frame, and an upper frame movably supported above the lower frame by the supports. The lift mechanisms may be configured to raise and lower the upper frame with respect to the lower frame and move the upper frame between various orientations, such as Trendelenburg and reverse Trendelenburg.

Figure 2:
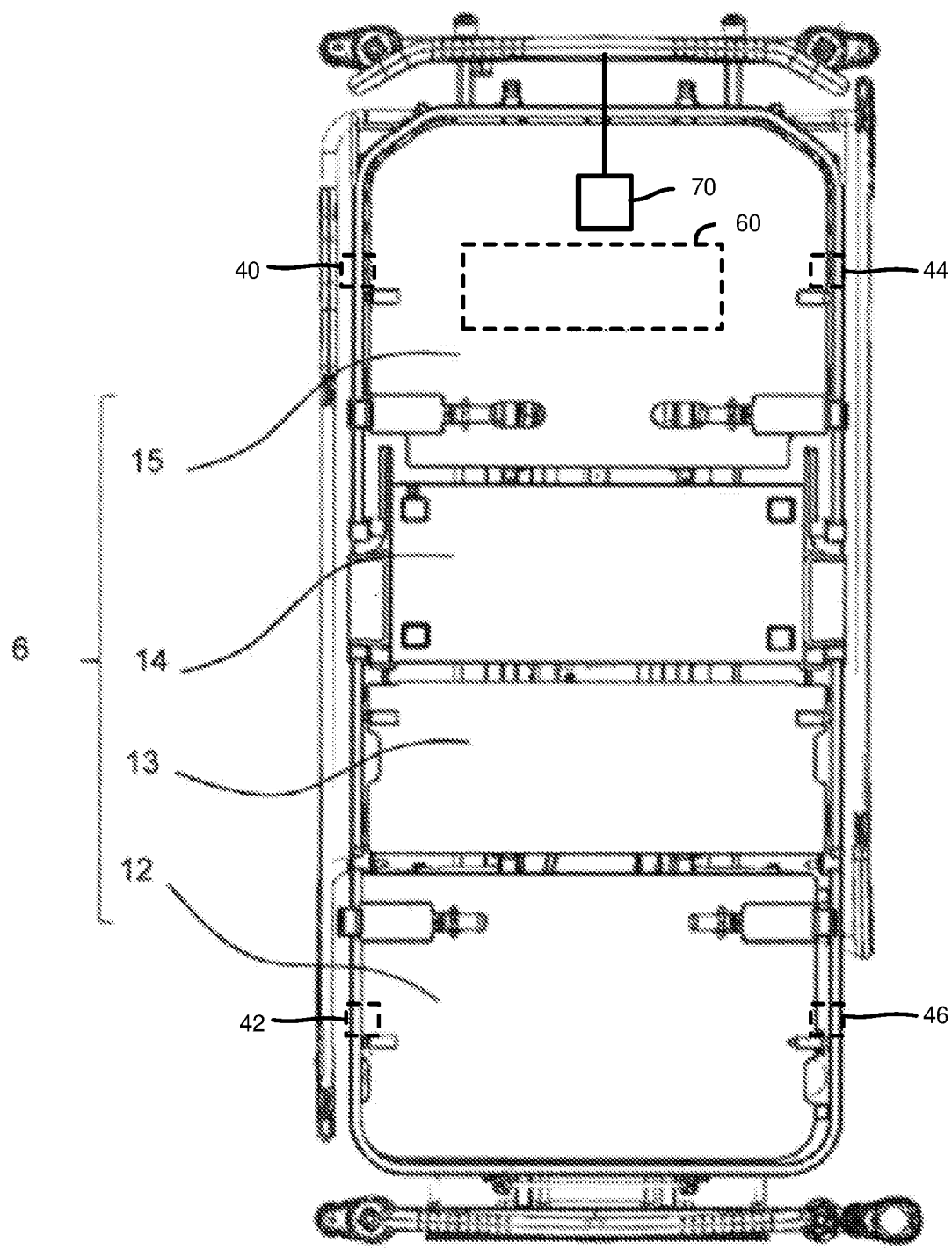
FIG. 2 is a top plan view of a patient support deck of the hospital bed of FIG. 1.

The upper frame carries a support deck 6 and a set of siderails 11. The illustrative deck 6 includes a leg section 12, a thigh section 13, a seat section 14, and a head and torso section 15, as shown in FIG. 2. The leg section 12 and the thigh section 13 define a lower limb support section. The head and torso section define an upper body support section. The leg section 12, the thigh section 13, and the seat section 14 define a lower body support section. The siderails 11 are configured to move between a deployed position and a storage position, and may be used to locate the perimeter of the upper frame and assist with ingress to the patient support apparatus 1 and egress from the patient support apparatus 1.

The patient support surface 3 (e.g., mattress), in the illustrative embodiment, is configured to support a person (e.g., a patient) thereon and move with the deck 6 between the various configurations. Further, in the illustrative embodiment, the patient support surface 3 includes a leg portion, a thigh portion, a seat portion, and a head and torso portion, which are each supported on corresponding sections 12, 13, 14, 15 of the deck 6.

The illustrative patient support apparatus 1 additionally includes a control graphical user interface (GUI) 22 located on an outboard side of one of the siderails 11. The GUI 22 illustratively includes bed position adjustment controls, including head up and down controls, leg up and down controls, chair positioning controls, Trendelenburg and reverse Trendelenburg controls, and bed up and down controls. In some embodiments, one or more of the above controls are manual (e.g., physical) controls, such as buttons, levers, or switches, rather than graphical controls on the GUI 22.

As shown in FIGS. 1 and 2, a set of load cells 40, 42, 44, 46 are positioned around the patient support apparatus 1 in the frame 2. In the illustrative embodiment, each load cell 40, 42, 44, 46 is a strain gauge load cell that includes a metal body with a set of four strain gauges set in a Wheatstone bridge circuit and secured to the metal body. The Wheatstone bridge circuit produces an output voltage indicative of an amount of strain (e.g., force) applied to the load cell 40, 42, 44, 46. In other embodiments, the load cells 40, 42, 44, 46 may be embodied as other types of transducers (e.g., capacitive load cells, vibrating wire load cells, piezoelectric load cells, etc.) capable of converting force into an electrical signal (e.g., voltage). While four load cells 40, 42, 44, 46 are shown, it should be understood that the number of load cells may vary from one embodiment to another.

Additionally, in the illustrative embodiment, a set of pressure sensors 50, 52, 54 are distributed throughout the patient support surface 3 (e.g., mattress). That is, the illustrative patient support surface 3, includes a set of bladders (not shown) that selectively inflate with air and deflate to provide support, as needed (e.g., as requested through the GUI 22), in corresponding regions of the patient support surface 3. As the weight of the patient presses down on a bladder (e.g., reducing the volume of the bladder), the internal pressure changes correspondingly and is sensed by the corresponding pressure sensor 50, 52, 54 (i.e., by a piezoresistive strain gauge in the pressure sensor) and converted to a corresponding electrical signal (e.g., voltage). In other embodiments, the pressure sensors 50, 52, 54 may utilize a different technology for sensing pressure, such as a capacitor having a capacitance that changes as a function of the pressure, an electromagnetic sensor that measures the displacement of a diaphragm through changes in inductance, and/or other technologies. While three pressure sensors 50, 52, 54 are shown in FIG. 1, it should be understood that the number of pressure sensors may vary from one embodiment to another.

In the illustrative embodiment, a machine learning compute device 60 is mounted to the frame 2, underneath the support deck 6. The machine learning compute device 60, in the illustrative embodiment, is capable of selectively operating in a training mode or an inference (e.g., trained) mode. Further, the machine learning compute device 60 is communicatively coupled to the load cells 40, 42, 44, 46 and the pressure sensors 50, 52, 54 and continually receives data therefrom to infer a condition (e.g., a short term condition, such as movements or the present position of the patient and/or a long term condition, such as a Braden score indicative of a risk for developing a pressure sore) of a patient on the patient support apparatus 1 based on sensor data (e.g., data from the load cells 40, 42, 44, 46 and the pressure sensors 50, 52, 54). In some embodiments, the machine learning compute device 60 may obtain data from other sources as sensor data (e.g., an accelerometer for monitoring the head of bed ("HOB") angle of the head of the frame 2, inputs received by the GUI 22, etc.).

A video camera 70 is suspended above the patient support surface 3 and is configured to record the position of the patient on the patient support surface 3 (e.g., from head to feet) over time. The video camera 70 is communicatively coupled to the machine learning compute device 60 and provides video data indicative of the actual condition ("ground truth") of the patient to the machine learning compute device 60. In the training mode of operation, the machine learning compute device 60 utilizes an inference model to produce an inference as to the condition of the patient based on the sensor data and compares the inference to the actual condition of the patient (e.g., as indicated in the video data and/or data from other sources such as an electronic medical records system) to determine the difference between the inference and the actual condition. The machine learning compute device 60 then adjusts the inference model as a function of the determined difference between the inference and the actual condition.

In the illustrative embodiment, the inference model is an artificial neural network in which nodes that mimic the behavior of biological neurons (e.g., producing an output value as a non-linear function of the sum of the input values) are connected to other nodes in a directed weighted graph, in which the weights of connections between nodes affect the importance of the connection (e.g., selectively increases or decreases the input value provided through the connection relative to input values provided through other connections to the same node). In other embodiments, the inference model may be or include a genetic algorithm, a support vector machine, or other data structure and/or set of algorithms that can be iteratively modified to more accurately produce an inference from a set of predictor variables (e.g., sensor data). In the illustrative embodiment, the machine learning compute device 60 repeats the above training operations (e.g., adjusting the weights of the connections between the nodes) until the difference between the inference and the actual condition satisfies a predefined threshold (e.g., the inference indicates the actual position and/or movements of the patient, the inference is within predefined range of an assessment score prepared by a human caregiver, such as Braden assessment score, of the patient, etc.). While illustrative embodiments of a training process are described herein, the training may occur through many available methodologies, such as reinforcement learning, supervised learning, or unsupervised learning.

Once the inference model is trained, the inference model may be utilized by the machine learning compute device 60 in the inference mode of operation to infer the condition of patients without receiving data indicative of the actual conditions of the patients (e.g., without the video camera). As such, the machine learning compute device 60, when configured with the trained inference model, may be deployed in hospital beds or other patient support apparatuses 1 that are not equipped with the video camera 70 or other sources of "ground truth" data, and accurately determine the condition of a patient based on sensor data.

Figure 3:
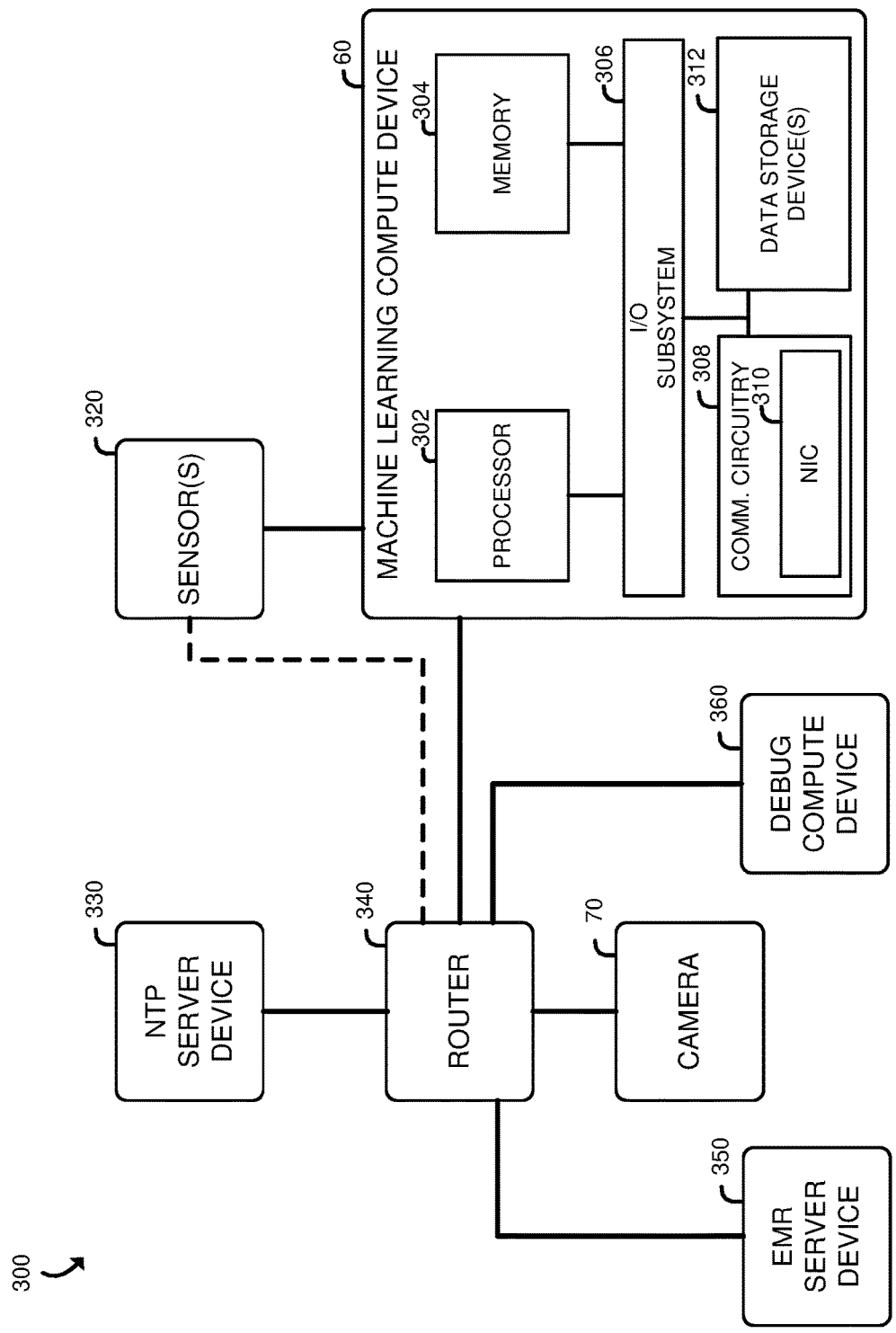
FIG. 3 is a block diagram of a system for training the machine learning compute device of FIG. 1 to infer a patient condition from sensor data.

Referring now to FIG. 3, an illustrative embodiment of a system 300 for training the machine learning compute device 60 (e.g., for training the inference model executed by the machine learning compute device 60) includes the machine learning compute device 60, a set of sensors 320 for providing sensor data (e.g., the load cells 40, 42, 44, 46, the pressure sensors 50, 52, 54, accelerometers, gyrometers, optical devices, electromechanical sensors, other sensors configured to indicate a status or configuration of the bed 1, etc.), the video camera 70, a network time protocol (NTP) server device 330, an electronic medical records (EMR) server device 350, a debug compute device 360, and a router 340. The router 340 is illustratively a wireless router. However, in other embodiments, the router 340 additionally or alternatively includes circuitry and components to enable wired communication between devices (e.g., the machine learning compute device 60, the camera 70, the NTP server device 330, the EMR server device 350, the debug compute device 360, etc.).

The NTP server device 330 is configured to provide data indicative of the present time to the machine learning compute device 60 and other devices in the system (e.g., the camera 70) to enable synchronization of the data (i.e., synchronization of sensor data with video data). The EMR server device 350 is configured to provide EMR data regarding a patient (e.g., information about the development of bed sores, information about the patient's mobility, etc. as assessed by a human caregiver) to the machine learning compute device 60. The debug compute device 360 is configured to enable a programmer or maintenance person to connect to, monitor, and modify the operations any of the devices 320, 330, 340, 350, 60, 70 in the system.

The illustrative machine learning compute device 60 includes a processor 302, a memory 304, an input/output (I/O) subsystem 306, communication circuitry 308, and one or more data storage devices 312. Of course, in other embodiments, the machine learning compute device 60 may include other or additional components, such as those commonly found in a computer (e.g., a display, peripheral devices, etc.). Additionally, in some embodiments, one or more of the illustrative components may be incorporated in, or otherwise form a portion of, another component. The illustrative processor 302 is embodied as a multi-core processor, wherein each core is capable of reading and executing a set of instructions (e.g., in a thread). In other embodiments, the processor 302 may be embodied as a microcontroller, or other processor or processing/controlling circuit. In some embodiments, the processor 302 may be embodied as, include, or be coupled to an FPGA, an application specific integrated circuit (ASIC), reconfigurable hardware or hardware circuitry, or other specialized hardware to facilitate performance of the functions described herein.

The illustrative main memory 304 is embodied as volatile memory (e.g., dynamic random access memory (DRAM)) capable of at least temporarily (e.g., while power is provided to the memory 304) retaining predictor variables (e.g., sensor data), response variables (e.g., video data, EMR data, etc.), and the inference model, and operating thereon (reading and/or writing to one or more of those data sets). In other embodiments, the memory 304 may include other types of volatile memory such as static random access memory (SRAM). In other embodiments, the memory 304 may include non-volatile memory (e.g., memory that retains data without power), such as flash memory (e.g., NAND memory or NOR memory).

The processor 302 and memory 304 are communicatively coupled to other components of the machine learning compute device 60 via the I/O subsystem 306, which is embodied as circuitry configured to facilitate input/output operations with the processor 302, the memory 304, and other components of the machine learning compute device 60. Depending on the embodiment, the I/O subsystem 306 may include one or more memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 304 forms a portion of a system-on-a-chip (SoC) and is incorporated, along with one or more of the processor 302, the main memory 304, and other components of the machine learning compute device 60, into a single chip.

The communication circuitry 308 is illustratively embodied as circuitry configured to enable communications over a network between the machine learning compute device 60 and other devices 70, 330, 350, 360 through the network (e.g., through the router 340). While shown as being directly connected to the machine learning compute device 60, in some embodiments, one or more of the sensors 320 may instead be in communication with the machine learning compute device 60 through the router 340. The communication circuitry 308, in the illustrative embodiment, is configured to utilize a wireless communication technology and associated protocols (e.g., a cellular networking protocol, Wi-Fi®, WiMAX, Ethernet, Bluetooth®, etc.) to effect such communication. However, the communication circuitry 308, in other embodiments, additionally or alternatively is configured to utilize a wired communication technology (e.g., Ethernet) to effect communication.

The illustrative communication circuitry 308 includes a network interface controller (NIC) 310 which is embodied as a chipset that enables the machine learning compute device 60 to connect with another device 70, 330, 350, 360 through the network (e.g., through the router 340). In some embodiments, the NIC 310 is embodied as part of a system-on-a-chip (SoC) that includes one or more processors, or included on a multichip package that also contains one or more processors. In some embodiments, the NIC 310 includes a local processor (not shown) and/or a local memory (not shown) that are both local to the NIC 310. In such embodiments, the local processor of the NIC 310 are capable of performing one or more of the functions of the processor 302 described herein. In such embodiments, the local memory of the NIC 310 may be integrated into one or more components of the machine learning compute device 60 at the board level, socket level, chip level, and/or other levels.

The illustrative data storage device 312 is embodied as a device configured for short-term and long-term storage of data (e.g., a hard disk drive). In other embodiments, the data storage device 312 is a solid-state drive or a memory card. In the illustrative embodiment, the data storage device 312 stores the learning model that is trained and utilized by the machine learning compute device 60 to produce inferences as to the condition of a patient. While shown as being included in the machine learning compute device 60, it should be understood that the data storage device 312 may be physically outside of any housing shared by the other components of the machine learning compute device 60 (e.g., the data storage device 312 may be an external drive connected through a universal serial bus (USB) connection, an external serial advanced technology attachment (eSATA) connection, or similar connection).

The devices 330, 340, 350, 360, in the illustrative embodiment, have components that are generally similar to those described with reference to the machine learning compute device 60, with the exception that those other devices do not maintain or operate on an inference model. Further, it should be understood that any of the devices in the system 300 may include other components commonly found in a computing device, which are not discussed above in reference to the machine learning compute device 60 and not discussed herein for clarity of the description. Further, it should be understood that one or more components of a device in the system 300 may be distributed across any distance, and are not necessarily housed in the same physical unit.

Figure 4:
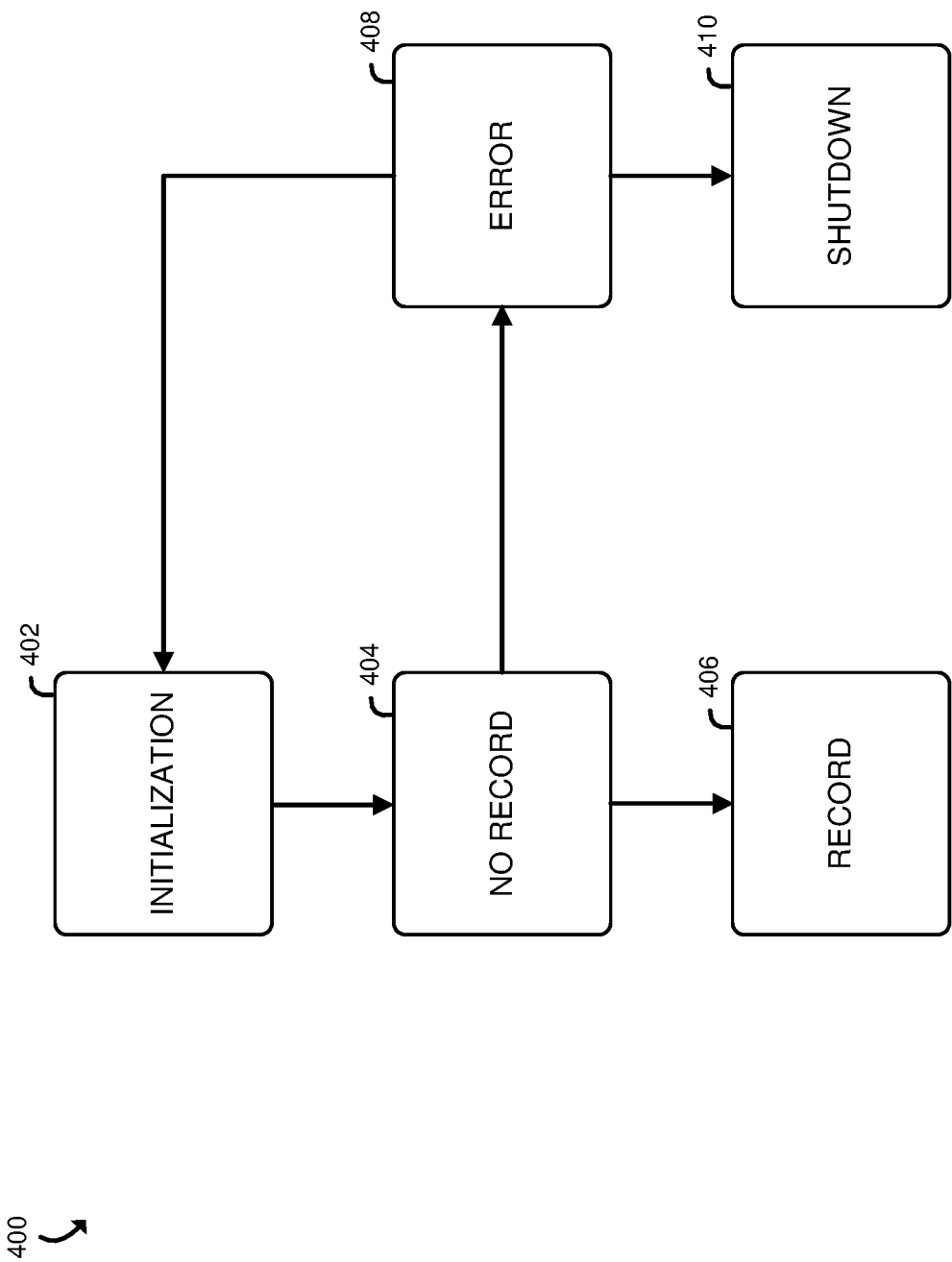
FIG. 4 is a diagram of states that the system of FIG. 3 may transition between when preparing to train an inference model on the machine learning compute device.

Referring now to FIG. 4, the illustrative system 300 of FIG. 3 transitions between a set of states 400 to prepare for training of the inference model. In the initialization state 402, the system 300 (e.g., the machine learning compute device 60) waits for an NTP service to start on the NTP server device 330. Additionally, in the initialization state 402, the machine learning compute device 60 creates a log file (e.g., in the data storage device 312). Subsequently, the system 300 transitions to a no record state 404 in which the system 300 determines whether the devices in the system 300 are receiving sufficient power and whether there is sufficient data storage capacity for training the inference model (e.g., whether sufficient data storage is available to record video data). If any of the above conditions are unsatisfied, the system 300 transitions to the error state 408 in which a timer begins. If the above conditions are not satisfied by the time the timer reaches a predefined value (e.g., ten seconds), the system 300 transitions to a shutdown state 410, in which the system 300 shuts down (i.e., until being reset or otherwise re-initialized). Referring back to the no record state 404, if the above conditions are satisfied, the system 300 instead transitions to a record state 406 in which the machine learning compute device 60 obtains video data from the video camera 70 (e.g., via the router 340) and writes the data to the data storage device 312 (e.g., in MPEG format).

Figure 5:
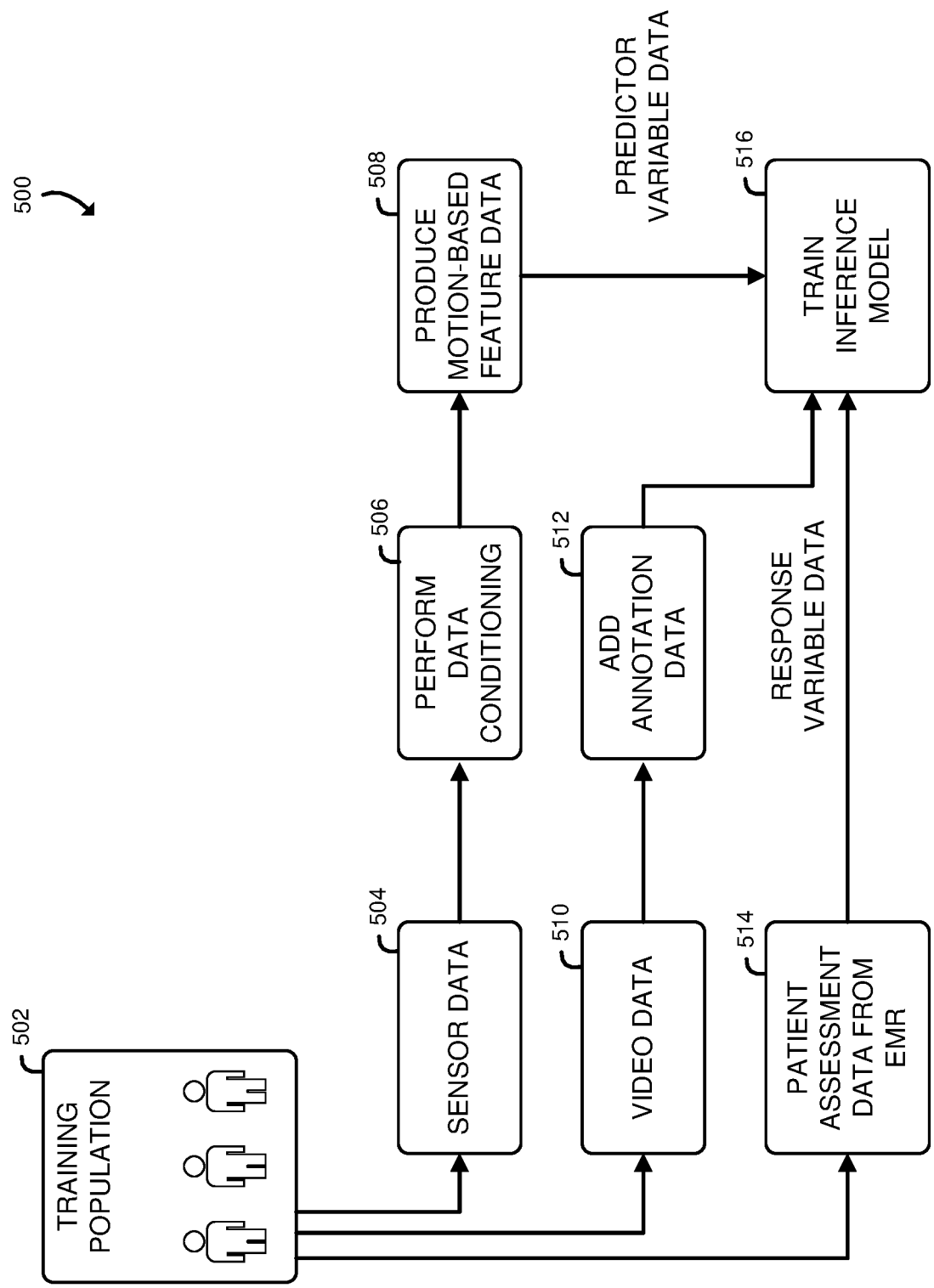
FIG. 5 is a high level diagram of a process for training the machine learning compute device of FIG. 1 to infer a patient condition from sensor data.

Referring now to FIG. 5, a process 500 for training the machine learning compute device 60 (e.g., the inference model executed by the machine learning compute device 60) is performed using a training population 502 of humans (e.g., patients). In the process 500, the system 300 obtains sensor data, in block 504, from a set of sensors (e.g., load cells 40, 42, 44, 46 and pressure sensors 50, 52, 54) associated with a product (e.g., a patient support apparatus 1, such as a hospital bed). Additionally, the system 300 performs data conditioning, in block 506, on the obtained sensor data. As described in more detail with respect to the method 700 of FIGS. 7 and 8, the data conditioning includes reformatting the sensor data to a predefined format, such as converting voltages to weight or pressure values and/or removing noise from the sensor data.

Subsequently, in block 508, the system 300 produces motion-based feature data. The motion-based feature data is illustratively embodied as data indicative of motions that have been performed by a patient (e.g., from the training population) in relation to the product (e.g., while on the hospital bed 1). For example, the motion-based feature data may indicate that a patient turned from one side of the hospital bed 1 to another side of the hospital bed 1, based upon a determination that the majority of the patient's weight has moved from one set of load cells 40, 42 to another set of load cells 44, 46. As indicated in bock 516, the machine learning compute device 60 utilizes the motion-based feature data from block 508 as predictor variable data (e.g., data usable to predict or infer a condition of a patient).

In block 510, the system 300 also obtains video data of a patient (e.g., from the training population 502). The video data is indicative of the actual condition (e.g., position, movements over time, etc.) of the patient, as captured by the video camera 70. In block 512, a human adds annotation data (e.g., metadata) that supplements the information in the video data. More specifically, in the illustrative embodiment, the annotation data is embodied as data that describes (e.g., in text or with predefined codes) the condition of the patient in the video data. Further, in block 514, the system 300 provides patient assessment data from an electronic medical record (EMR) system (e.g., the EMR server device 350). The patient assessment data, in the illustrative embodiment, is indicative of the actual condition (e.g., the longer term, more general condition, such as mobility assessment, development of bed sore(s), etc.) of the patient.

The video data with annotation data, and the patient assessment data from the EMR system are provided to the machine learning compute device 60 as response variable data (e.g., data indicative of the actual condition) of each patient from the training population 502 (i.e., whose data is represented in the predictor variable data and the response variable data). The machine learning compute device 60 iteratively provides the predictor variable data to the inference model to produce an inference as to the actual condition of the corresponding patient, determines the difference between the inferred condition and the action condition, and adjusts (e.g., modifies weights of connections between nodes of an artificial neural network) the inference model based on the determined difference until the difference satisfies a predefined threshold (e.g., is within a predefined range of zero).

Figure 6:
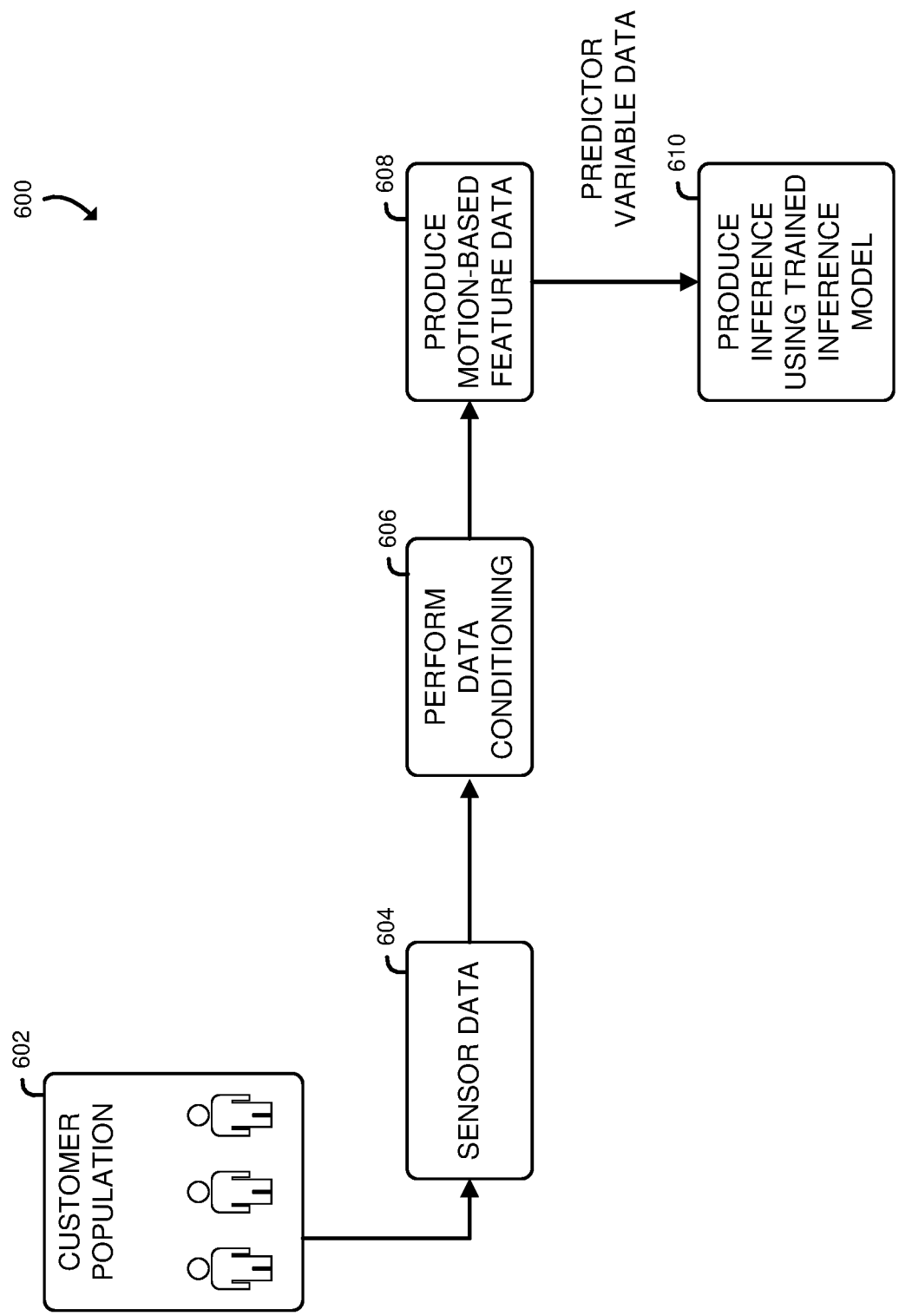
FIG. 6 is a high level diagram of using the trained machine learning compute device of FIG. 1 to infer a patient condition from sensor data.

Referring now to FIG. 6, in an inference (trained) mode of operation, the machine learning compute device 60 executes an already-trained inference model (e.g., loaded from the data storage device 312) to carry out a process 600 of inferring the actual condition of each of one or more patients of a customer population 602. In block 604, the system 300 obtains sensor data, similar to block 504 of the process 500. Additionally, the system 300 performs data conditioning in block 606, similar to block 506 of the process 500. Further, the system 300 produces motion-based feature data in block 608, similar to block 508 of the process 500. Subsequently, the system 300 produces an inference of the actual condition of the corresponding patient using the trained inference model, as indicated in block 610. Unlike block 516 of the process 500, in the process 600, the system 300 does not obtain response variable data (i.e., video data or assessment data from an EMR system). Rather, the system 300 (e.g., the machine learning compute device 60) makes inferences as to the conditions of patients from the population 602 using an inference model that has already been trained to accurately determine the condition of a patient from the predictor variable data. As such, the hospital bed 1 may be deployed to hospitals to infer the conditions of patients without being equipped with or connected to sources of response variable data (e.g., the video camera 70 and/or the EMR server device 350).

Figure 7:
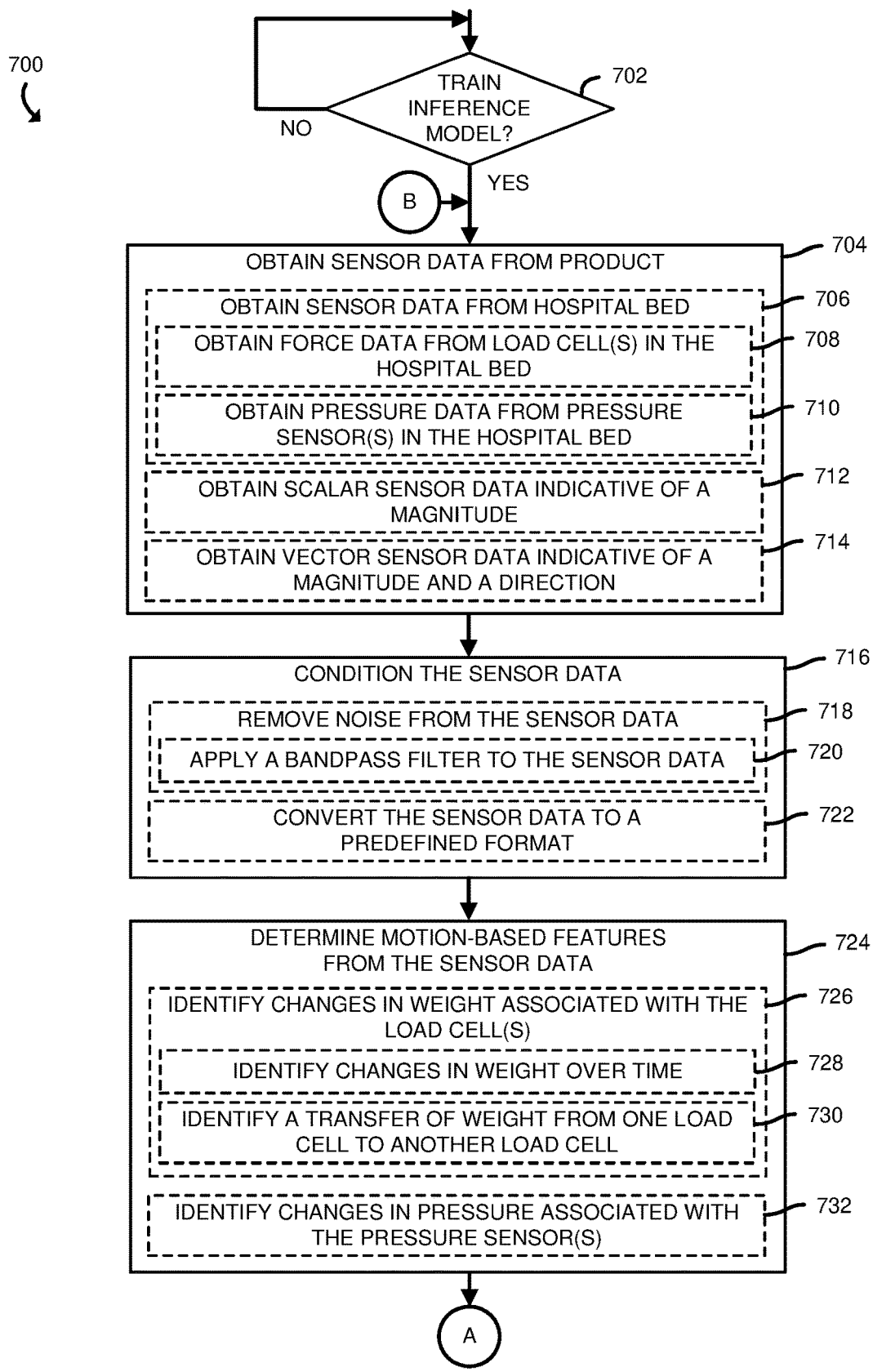
FIGS. 7-8 are flow diagrams of a method for training the machine learning compute device of FIG. 1 to infer a patient condition from sensor data.

Referring now to FIG. 7, in operation, the illustrative system 300 executes a method 700 for training the machine learning compute device 60 (e.g., the inference model executed by the machine learning compute device 60) to accurately infer a patient condition from sensor data. The method 700, in the illustrative embodiment, begins with block 702 in which the machine learning compute device 60 determines whether to train the inference model. The machine learning compute device 60, in the illustrative embodiment, determines to train the inference model in response to a determination that the machine learning compute device 60 is communicatively coupled to sources of the sensor data (e.g., the load cells 40, 42, 44, 46 and the pressure sensors 50, 52, 54) and the response variable data (e.g., the video camera 70 and the EMR server device 350). In other embodiments, the machine learning compute device 60 may determine to train the inference model based on other factors. Regardless, in response to a determination to train the inference model, the method 700 advances to block 704 in which the machine learning compute device 60 obtains sensor data from a product.

In the illustrative embodiment, the machine learning compute device 60 obtains sensor data from the hospital bed 1, as indicated in block 706. In doing so, the machine learning compute device 60 obtains force data from load cells (e.g., the load cells 40, 42, 44, 46) in the hospital bed 1, as indicated in block 708. In some embodiments, the machine learning compute device 60 additionally or alternatively obtains pressure data from pressure sensors (e.g., the pressure sensors 50, 52, 54) in the hospital bed 1, as indicated in block 710. The machine learning compute device 60, in some embodiments, obtains sensor data from alternative or additional sources, such as an accelerometer for monitoring the head of bed ("HOB") angle of the head of the bed frame 2, the GUI 22, and/or inputs from physical buttons (e.g., a button to adjust a position of the bed 1). As such, in some embodiments, sensor data received from one source (e.g., the load cells 40, 42, 44, 46) may indicate one condition of the patient (e.g., that the patient is turning) and data from another source (e.g., data indicating a button press to adjust the position of the bed 1), when also taken into account, may indicate a slightly different or more nuanced condition of the patient (e.g., that the patient was turning only momentarily to press a button on the side of the bed 1, rather than to stay in the turned position for a longer period of time). In obtaining sensor data, the machine learning compute device 60, in the illustrative embodiment, obtains scalar data (e.g., data indicative of a magnitude, such as an amount of pressure), as indicated in block 712. In some embodiments, the machine learning compute device 60 additionally or alternatively receives sensor data indicative of a vector (e.g., a magnitude and a direction, such as an amount of force and the direction of the force), as indicated in block 714.

In block 716, the system 300 (e.g., the machine learning compute device 60) conditions the sensor data that was obtained in block 704. In some embodiments, in conditioning the sensor data, the machine learning compute device 60 removes noise from the sensor data, as indicated in block 718. For example, the machine learning compute device 60, in some embodiments, applies a bandpass filter to the sensor data (e.g., to exclude sensor data having frequencies outside of a predefined range of frequencies), as indicated in block 720. In the illustrative embodiment, and as indicated in block 722, the machine learning compute device 60 converts the sensor data to a predefined format (e.g., by converting voltage values from the load cells 40, 42, 44, 46 to force or weight values, by normalizing sensor data from each of the load cells 40, 42, 44, 46, etc.).

Subsequently, in block 724, the machine learning compute device 60 determines motion-based features from the sensor data. In doing so, in the illustrative embodiment, the machine learning compute device 60 identifies any changes in weight associated with one or more of the load cells 40, 42, 44, 46, as indicated in block 726. For example, the machine learning compute device 60, in the illustrative embodiment, compares, for each load cell 40, 42, 44, 46, a measurement from a previous time period to a present measurement reported by the load cell, as indicated in block 728. A change in the weight over time may be indicative of the patient turning in the bed (e.g., if the weight is applied to a different load cell of the hospital bed 1), the patient laying onto the bed (e.g., if the total amount of weight reported by the load cells 40, 42, 44, 46 increases by the amount that the patient weights), or the patient leaving the bed (e.g., if the total amount of weight reported by the load cells 40, 42, 44, 46 decreases by the amount that the patient weighs).

Relatedly, the machine learning compute device 60 identifies any transfers of weight from one load cell (e.g., the load cell 40) to another load cell (e.g., the load cell 44), as indicated in block 730. Additionally, in the illustrative embodiment, the machine learning compute device 60 identifies any changes in pressure associated with the pressure sensors 50, 52, 54, which may be indicative of movement of the patient using the hospital bed 1, as indicated in block 732. Subsequently, the method 700 advances to block 734 of FIG. 8, in which the machine learning compute device 60 obtains response variable data indicative of an actual condition of the patient associated with the sensor data.

Figure 8:
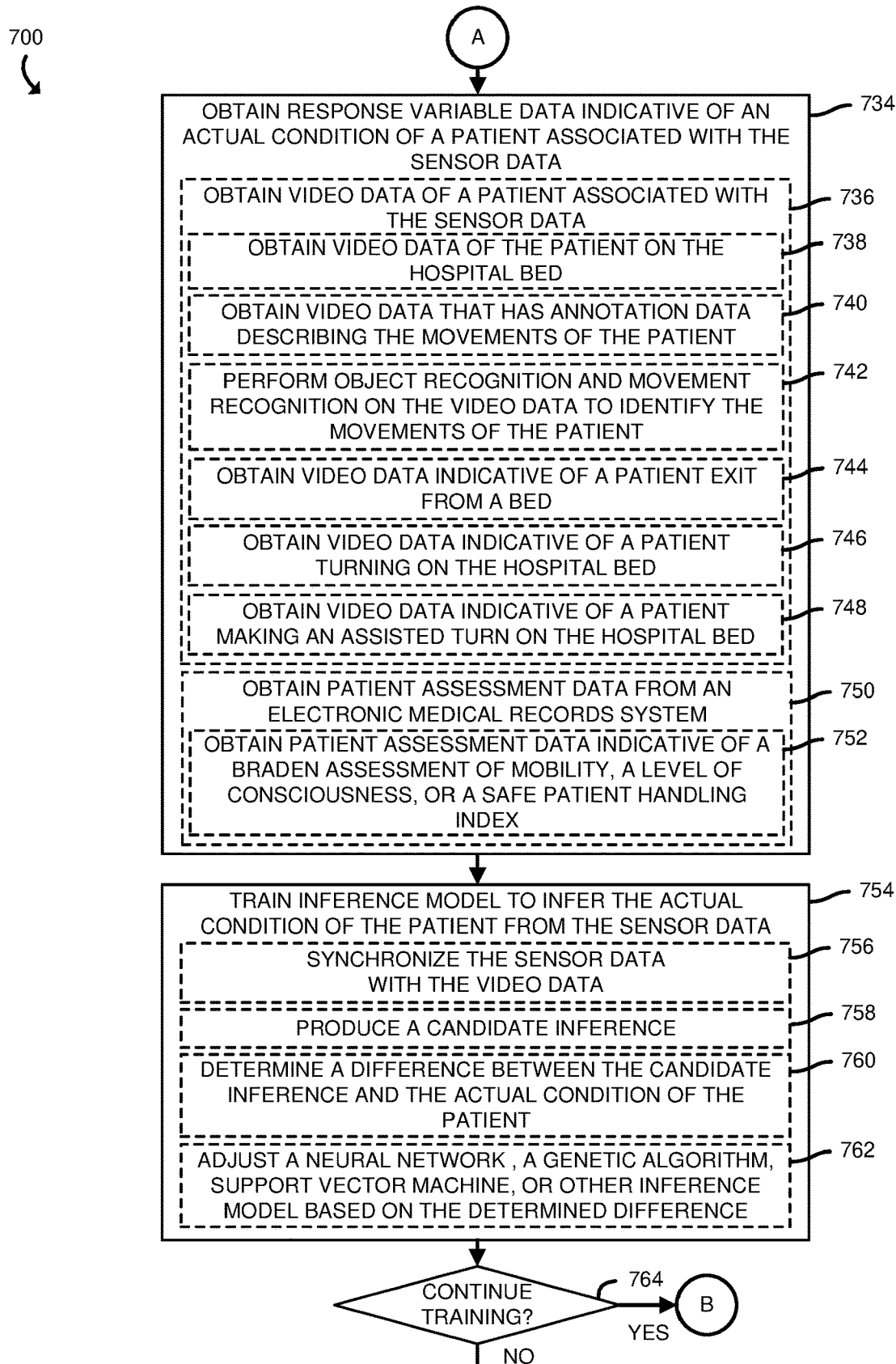

Referring now to FIG. 8, in obtaining the response variable data, the machine learning compute device 60, in the illustrative embodiment, obtains video data of the patient associated with the sensor data, as indicated in block 736. In doing so, and as indicated in block 738, the machine learning compute device 60 obtains video data of the patient on the hospital bed 1. Further, in the illustrative embodiment, the machine learning compute device 60 obtains video data that has (e.g., is supplemented with) annotation data describing the movements of the patient, as indicated in block 740. The annotation data, in the illustrative embodiment, is provided by a human who has watched the video data and has manually entered the annotation data (e.g., textual descriptions or codes that are recognizable by the machine learning compute device 60). In other embodiments, and as indicated in block 742, the machine learning compute device 60 performs object recognition and motion recognition on the video data to identify the movements of the patient represented in the video data.

As indicated in blocks 744, 746, and 748, the video data obtained by the machine learning compute device 60 may indicate the patient exiting the hospital bed 1, the patient turning on the hospital bed (e.g., without assistance), and/or the patient turning on the hospital bed 1 with assistance (e.g., by a caregiver who may lean on the bed and press against the patient to help the patient turn, by the hospital bed 1 pressurizing one or more bladders to help turn the patient, etc.). Of course, other movements and data indicative of the actual condition of the hospital bed 1 may additionally or alternatively be represented in the obtained video data. In the illustrative embodiment, and as indicated in block 750, the machine learning compute device 60 also obtains patient assessment data from an electronic medical records system (e.g., the EMR server device 350). As indicated in block 752, the patient assessment data is indicative of a Braden assessment of mobility, a level of consciousness of the patient, and/or a safe patient handling index. In other embodiments, the patient assessment data is indicative of other assessments that were provided by a caregiver who examined the patient.

Subsequently, in block 754, the machine learning compute device 60 trains the inference model to accurately infer the actual condition of the patient from the sensor data (e.g., obtained in block 704). In doing so, and as indicated in block 756, the machine learning compute device 60 synchronizes the sensor data with the video data (e.g., using timing information from the NTP server device 330). During training, and as indicated in block 758, the machine learning compute device 60 produces a candidate inference as to the condition of the patient (e.g., that the patient turned to a particular side of the hospital bed 1, that the patient exited the bed, that the patient has a particular likelihood of developing a bed sore, etc.) corresponding to the sensor data and the response variable data. In other embodiments, the inference model may be trained to produce a candidate inference pertaining to other or additional conditions of the patient, such as a sleep condition (e.g., amount of sleep, quality of sleep, etc.), body position (e.g., side lying, supine, sitting up, etc.), agitation, mobilization or ambulation, activity (e.g., as defined by the Braden Scale), delirium, Falls score-attribute (e.g., as an indicator of the likelihood of the person to fall and distinguished from someone moments from falling), Falls score-immediate (e.g., a person who is moments from falling), and/or likelihood to exit the bed 1.

Afterwards, and as indicated in block 760, the machine learning compute device 60 determines a difference between the candidate inference and the actual condition of the patient (e.g., as represented in the response variable data). In the illustrative embodiment, in which the inference model is an artificial neural network, the difference is represented by an error value which can be used in a feedback loop to adjust the weights or one or more connections between nodes of the artificial neural network (e.g., to reduce the error on a subsequent inference). As indicated in block 762, the machine learning compute device 60 adjusts the inference model based on the determined difference. For example, and as discussed above, in the illustrative embodiment, the machine learning compute device 60 adjusted the weights of one or more connections between nodes of an artificial neural network based on the determined difference (e.g., error value). In other embodiments in which the inference model is embodied as a different machine learning algorithm and/or data structure, the machine learning compute device 60 makes corresponding adjustments to the inference model according to the specific embodiment. For example, the machine learning compute device 60 may adjust a genetic algorithm (e.g., changing one or more operators or variables present in the algorithm) or may update a support vector machine.

In block 764, the machine learning compute device 60 determines whether to continue training the inference model. In the illustrative embodiment, the machine learning compute device 60 makes the determination based on whether the difference between the candidate inference and the actual condition satisfies a predefined threshold (e.g., the error value is within a predefined range of zero). If the machine learning compute device 60 determines to continue training (e.g., the error value is not within the predefined range of zero), the method 700 loops back to block 704 to repeat the training process (e.g., for the same patient or a different patient). While the method 700 is shown and described as being performed in a particular order, it should be understood that some of the operations in the method 700 may be performed in a different order or concurrently (e.g., obtaining sensor data while concurrently obtaining video data).

Figure 9:
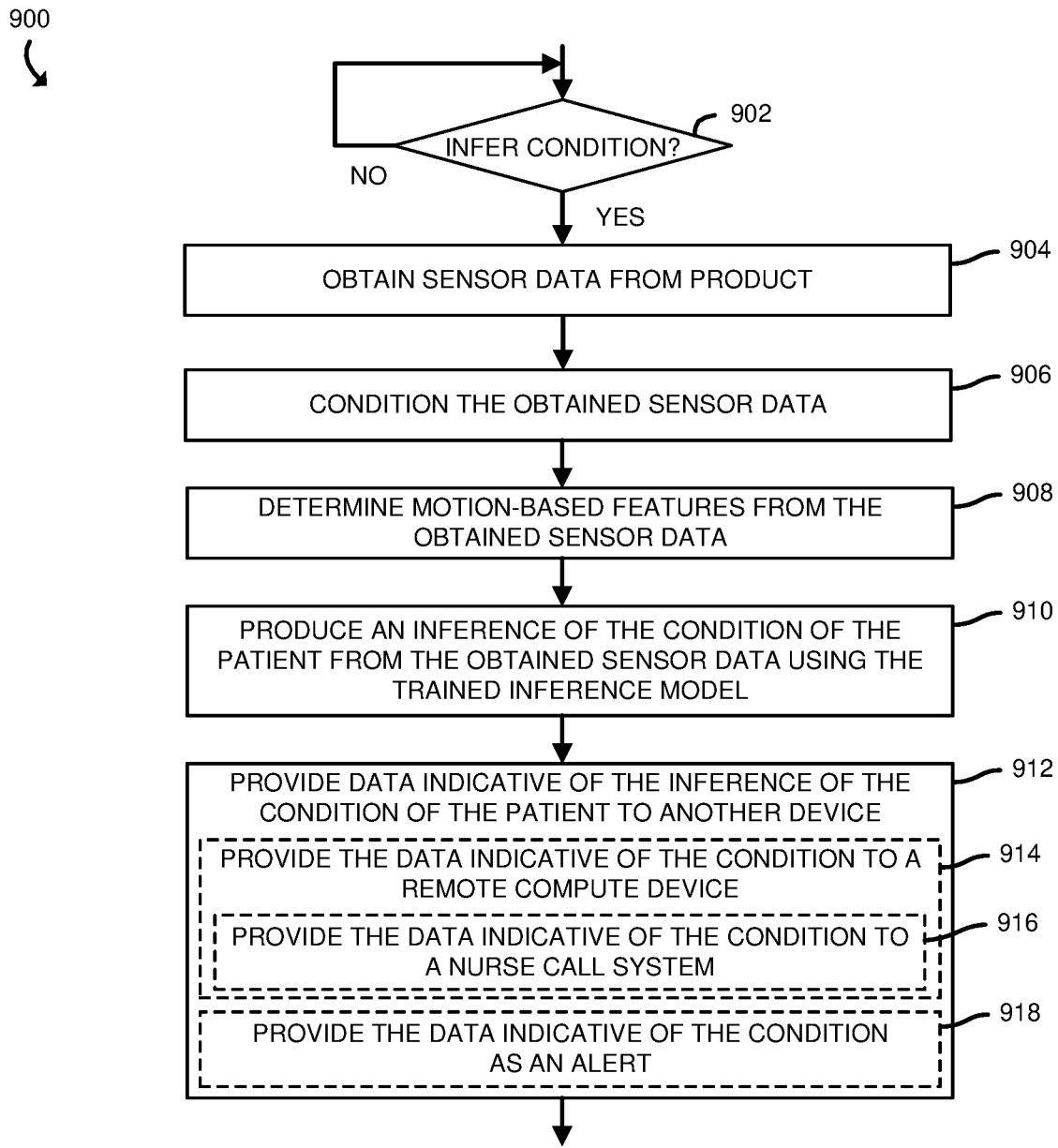
FIG. 9 is a flow diagram of a method for inferring a patient condition from sensor data that may be performed by the machine learning compute device of FIG. 1.

Referring now to FIG. 9, the system 300 may execute a method 900 for inferring a patient condition from sensor data. In the illustrative embodiment, the method 900 begins with block 902, in which the machine learning compute device 60 determines whether to infer a condition of a patient. In making the determination, the machine learning compute device 60, in the illustrative embodiment, determines whether the machine learning compute device 60 is equipped with (e.g., whether the data storage device 312 has data that defines) a trained inference model. In other embodiments, the machine learning compute device 60 may make the determination based on additional or alternative factors. Regardless, in response to a determination to infer a condition of a patient, the method 900 advances to block 904, in which the machine learning compute device 60 obtains sensor data from the product (e.g., from the hospital bed 1), similar to block 704 of FIG. 7.

Subsequently, the machine learning compute device 60 conditions the obtained sensor data, as indicated in block 906, performing operations similar those described with reference to block 716 of FIG. 7. Additionally, and as indicated in block 908, the machine learning compute device 60 determines motion-based features from the obtained sensor data, similar to block 724 of FIG. 7. Subsequently, and as indicated in block 910, the machine learning compute device 60 produces an inference of the condition of the patient from the obtained sensor data, similar to the inference produced in block 758 of FIG. 7, but using the trained inference model.

Additionally, in block 912, the machine learning compute device 60 provides data indicative of the inference of the condition of the patient to another device. In doing so, and as indicated in block 914, the machine learning compute device 60 provides the data to a remote compute device. For example, in some embodiments, the machine learning compute device 60 provides the data to a nurse call system (not shown), as indicated in block 916. As indicated in block 918, if the inferred condition satisfies predefined criteria (e.g., the inferred condition is a patient fall), the machine learning compute device 60 provides the data as an alert (e.g., sends the data indicative the condition with a code or other metadata indicating that the data is associated with an alert).

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A machine learning compute device comprising:
 circuitry configured to:
 obtain sensor data from a product associated with a patient;
 obtain response variable data indicative of an actual condition of the patient associated with the sensor data, wherein the response variable data includes (i) annotation data that describes the actual condition of the patient and (ii) patient assessment data from an electronic medical record (EMR) system;
 operate in a training mode to train, based on the response variable data and the sensor data, an inference model to infer the actual condition of the patient from the sensor data, wherein training includes synchronizing (i) the sensor data and (ii) video data, and wherein the sensor data does not include image data, wherein the inference model comprises a neural network having interconnected nodes in which weights of connections between the nodes are adjusted iteratively until a difference between an inferred condition of the patient and the actual condition satisfies a predefined threshold;
 after the predefined threshold is satisfied in the training mode, operate in a trained mode to determine the patient's inferred condition based on the sensor data and without use of further video data;
 deploy the inference model to one or more patient support apparatuses not equipped with any video camera or other sources of ground truth data, to enable the one or more patient support apparatuses to accurately determine the condition of a corresponding patient based on sensor data of the respective patient support apparatus; and
 if the inferred condition satisfies predefined criteria, provide an alert to a remote compute device.

2. The machine learning compute device of claim 1, wherein to obtain sensor data comprises to obtain sensor data from a hospital bed.

3. The machine learning compute device of claim 2, wherein to obtain sensor data from the hospital bed comprises to obtain force data from one or more force transducers of the hospital bed.

4. The machine learning compute device of claim 2, wherein to obtain sensor data from the hospital bed comprises to obtain pressure data from one or more pressure sensors of the hospital bed.

5. The machine learning compute device of claim 2, wherein to obtain sensor data from the hospital bed comprises to obtain sensor data from one or more accelerometers, gyrometers, optical devices, electromechanical sensors, or other sensors configured to indicate a status or configuration of the product.

6. The machine learning compute device of claim 2, wherein to obtain sensor data from the hospital bed comprises to obtain scalar data or vector data indicative of a magnitude and a direction.

7. The machine learning compute device of claim 1, wherein the product includes a sensor to produce the sensor data, wherein the circuitry is further configured to condition the sensor data produced by the sensor, and wherein to condition the sensor data comprises to remove noise from the sensor data, including applying a bandpass filter to the sensor data.

8. The machine learning compute device of claim 1, wherein to obtain response variable data indicative of an actual condition of the patient associated with the sensor data comprises to obtain the video data, wherein the video data represents a patient associated with the sensor data.

9. The machine learning compute device of claim 8, wherein the product comprises a hospital bed and wherein to obtain video data comprises to obtain video data of the patient on the hospital bed.

10. The machine learning compute device of claim 8, wherein to obtain video data comprises to obtain video data that has annotation data that describes movements of the patient in relation to the product.

11. The machine learning compute device of claim 8, wherein the product comprises a hospital bed and wherein to obtain video data comprises to obtain video data indicative of a patient exit from the hospital bed.

12. The machine learning compute device of claim 1, wherein the circuitry is further configured to synchronize the sensor data and the video data using time data from a network time protocol server device communicatively coupled to the machine learning compute device.

13. The machine learning compute device of claim 2, wherein the circuitry is mounted to the hospital bed.

14. The machine learning compute device of claim 2, wherein to obtain sensor data comprises to obtain sensor data from a head of bed (HOB) angle sensor of the hospital bed.

15. The machine learning compute device of claim 3, wherein the one or more force transducers comprise one or more load cells.

16. The machine learning compute device of claim 15, wherein the one or more load cells comprise one or more strain gauges.

17. The machine learning compute device of claim 4, wherein the one or more pressure sensors sense a change in capacitance or inductance.

18. The machine learning compute device of claim 1, wherein the assessment data comprises data indicative of a Braden assessment of mobility.

19. The machine learning compute device of claim 1, wherein the assessment data comprises data indicative of a level of consciousness of the patient.

20. The machine learning compute device of claim 1, wherein the assessment data comprises data indicative of a safe patient handling index.

* * * * *